United States Patent
Vogel et al.

(12) 
(10) Patent No.: US 6,405,262 B1
(45) Date of Patent: *Jun. 11, 2002

(54) EFFICIENT INTER-PROCESS OBJECT AND INTERFACE PINGING

(75) Inventors: Keith R. Vogel, Duvall; Richard P. Draves; Paul J. Leach, both of Seattle, all of WA (US)

(73) Assignee: Microsoft Corporation, Redmond, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/502,376

(22) Filed: Jul. 14, 1995

(51) Int. Cl.$^7$ .................................................. G06F 9/44
(52) U.S. Cl. ........................................ 709/315; 709/203
(58) Field of Search .......................... 395/200, 200.11, 395/200.13, 481, 683; 709/315, 316, 328, 313, 203, 201, 224, 223, 229

(56) References Cited

U.S. PATENT DOCUMENTS

| | | | | |
|---|---|---|---|---|
| 4,920,484 A | * | 4/1990 | Ranade ........................ | 364/200 |
| 5,109,486 A | * | 4/1992 | Seymour ..................... | 395/200 |
| 5,185,860 A | * | 2/1993 | Jeff ............................. | 395/200 |
| 5,329,619 A | * | 7/1994 | Pagé et al. .................. | 395/200 |

(List continued on next page.)

OTHER PUBLICATIONS

Joint Submission on Interoperability Between Microsoft Component Object Model and OMG Common Object Request Broker 2.0, OMG, pp. 1–24, Aug. 31, 1994.*
Lecture Notes in Computer Science, PARLE, 1987.
PARLE '91 vol. I: Parallel Architectures and Algorithms, 1991.

*Primary Examiner*—Alvin Oberley
*Assistant Examiner*—Sue Lao
(74) *Attorney, Agent, or Firm*—Lee & Hayes, PLLC (57) ABSTRACT

A computer system includes a plurality of client processes executing in respective address spaces and at least one server process executing in a different address space than the client processes. The server process has one or more available server objects for potential use by the client processes. The server objects are accessible by the client processes through a plurality of server object interfaces dynamically created in response to demand for said interfaces by the client processes. The server object interfaces are destroyed when there is no further demand for them. Each object interface can be simultaneously held for use during at least a portion of its lifetime by more than one of the client processes. The computer system further includes one or more client-side ping managers and at least one server-side ping manager. Each client process registers interfaces it is holding for use with an associated client-side ping manager. The server-side ping manager is associated with the server process and stores one or more interface lists indicating server object interfaces held for use by client processes. The server-side ping manager has a ping manager object interface available to the client-side ping managers. Each client-side ping manager accesses the server-side ping manager through the ping manager object interface to maintain an interface list with the server-side ping manager indicating server object interfaces which are registered with the client-side ping manager. Each client-side ping manager monitors whether any of its registered client processes have terminated, and automatically unregisters the interfaces of any such client processes which have terminated. The server-side ping manager notifies the server process of any server object interfaces which are no longer included in the interface lists of the server-side ping manager so that those interfaces can be destroyed.

29 Claims, 5 Drawing Sheets

U.S. PATENT DOCUMENTS

| | | | |
|---|---|---|---|
| 5,377,350 A | * 12/1994 | Skinner | 395/600 |
| 5,446,901 A | * 8/1995 | Owicki et al. | 395/481 |
| 5,453,933 A | * 9/1995 | Wright et al. | 364/474.23 |
| 5,465,351 A | * 11/1995 | Lemmo | 395/600 |
| 5,539,909 A | * 7/1996 | Tanaka et al. | 395/683 |
| 5,546,583 A | * 8/1996 | Shriver | 395/650 |
| 5,548,727 A | * 8/1996 | Meehan | 395/200.13 |
| 5,600,797 A | * 2/1997 | Marshall | 395/200.11 |

* cited by examiner

EFFICIENT INTER-PROCESS OBJECT AND INTERFACE PINGING

TECHNICAL FIELD

This invention relates to object-oriented systems utilizing inter-process pinging methods.

BACKGROUND OF THE INVENTION

In multi-process computer systems it is desirable to provide facilities for allowing one process to utilize the resources of another process. The process using the resources is referred to as a client process and the process providing the resources is referred to as a server process. In many cases, a particular process might be both a client process and a server process, in that it uses the resources of other server processes while also providing resources of its own for use by other client processes.

It is also desirable to provide a standard interface mechanism between processes so that application programs from different vendors can conveniently share resources using a common protocol. One type of such interface mechanisms utilizes the concept of "objects" and "object interfaces" to specify interactions between computers. An object in this environment is a unit of functionality that implements one or more interfaces to expose that functionality. An interface is a contract between the user, or client, of some object and the object itself. In more practical terms, an object is a collection of related data and functions grouped together for some distinguishable common purpose. The purpose is generally to provide services to client processes. An interface is a grouping of semantically related functions through which a client process can access the services of the object.

The invention described below has been implemented in a Microsoft Windows NT® programming environment using features of Object Linking and Embedding (OLE). OLE is based on a protocol referred to as the Component Object Model (COM). COM specifies how objects interact with each other using interfaces. OLE and COM have been well documented and will not be explained in detail here except for general concepts which are particularly pertinent to this invention. For more information regarding OLE and COM, refer to "OLE 2 Programmer's Reference" and "Inside OLE 2," both published by Microsoft Press of Redmond, Wash., and both of which are hereby incorporated by reference.

In the COM environment, an interface is a block of memory containing an array of function pointers—that is, a function table. Through a standard object interface referred to as IUnknown, a client process can obtain a pointer to any interface supported by an object. When such an interface pointer has been obtained, it is said that the client process has obtained an interface on the object. The pointer does not provide access to the entire object; instead, it allows access to one interface on that object.

Figure 1:
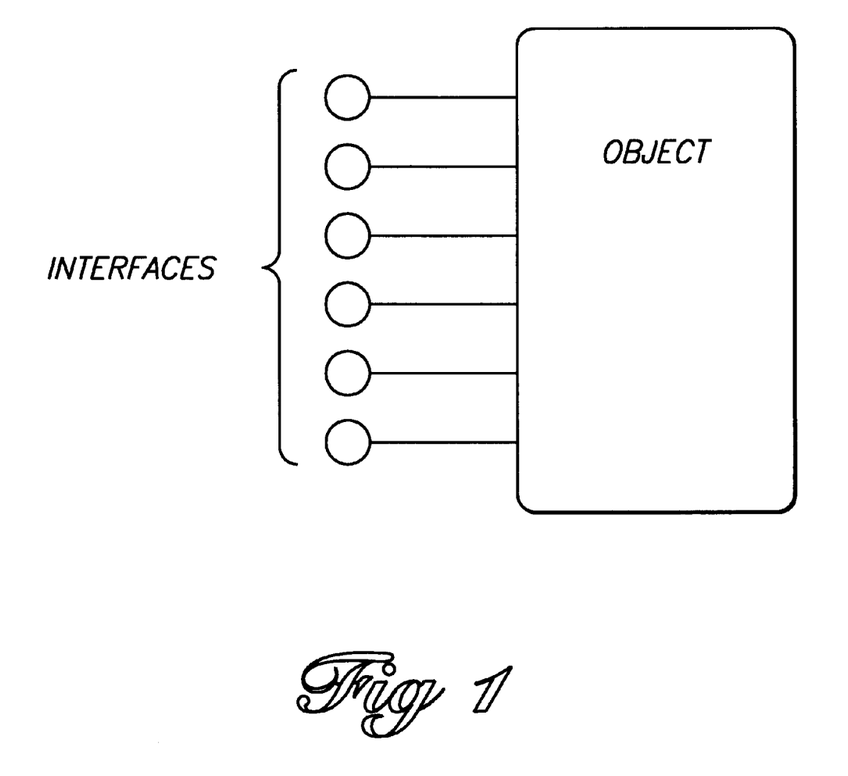
FIG. 1 is a figurative representation of an object and associated interfaces on that object.

Objects and their interfaces are conventionally illustrated as shown in FIG. 1. A circle is used to represent each interface.

The services or functions of an object can be used by both in-process clients and by out-of-process clients. In addition, an interface can be used by a client executing on a different computer. The COM protocol covers all of these situations. Calling a remote interface (one that is in a different address space than the calling process) requires the use of "stubs" and "proxies," and involves topics such as "marshalling" and "unmarshalling" of procedure parameters. These mechanisms are well understood and are documented in the books mentioned above. In regard to these topics, also refer to "X/Open DCE: Remote Procedure Call," published by X/Open Company Ltd., U.K, which is also incorporated by reference.

Objects must be instantiated in memory before they can be used. Once instantiated, they must be kept alive (remain in memory in a running or active state) until they are no longer needed. To maximize available memory, it is desirable to destroy objects (remove them from memory) and their interfaces when they are no longer needed. In order for the server process to keep track of when it is safe to destroy an object, COM implements reference counting. Through reference counting, a server object can keep track of whether any clients are still holding one or more interfaces on a server object. A client process is said to be holding an interface if it has obtained a pointer to the interface (usually by calling QueryInterface, a method of the IUnknown interface) and has not released it (by calling Release, another method of the IUnknown interface). An object must be is kept alive if there are one or more client processes holding one or more interfaces on the object. Reference counting involves simply incrementing a variable every time a pointer to an interface is obtained, and decrementing the variable every time a pointer to the interface is released. In some cases (such as in OLE), the practice is to maintain a single variable for an object—the single variable is incremented or decremented regardless of which interface on the object is obtained or released. Other operating systems might maintain an individual variable for each interface so that the resources associated with an individual interface can be destroyed apart from the associated object. In this case, an interface is destroyed if its reference count goes to zero. An object is destroyed when all its interfaces have been destroyed.

Although reference counting works well in theory, it assumes that all client processes are well behaved and that they cooperate properly with reference counting procedures. However, this is not always the case, and it is not uncommon for a client process to somehow neglect to release an interface. This can happen through software design error or through hardware failure. Instances of this problem are even more frequent in multi-computer environments, where client and server processes reside on different computers. A failure in the client computer or in communications channels can make it impossible for a client process to notify the server process that it has released an interface.

In order to deal with this potential problem, some computer network systems employ what is referred to as "pinging." Periodically, at selected ping periods, every client process that holds an interface on an object sends a keep-alive signal to the interface. As long as the interface continues to get keep-alive signals, the server process will keep the interface alive. After a pre-defined time without receiving a keep-alive signal, the server process will assume that there are no surviving client processes needing the interface, and the interface will be destroyed. The object with which the interface is associated will be destroyed only if all of its interfaces are destroyed.

The combination of reference counting and pinging would be effective except that pinging puts a tremendous load on computer resources and inter-process communications facilities. This is because of the great number of interfaces which might be implemented by a particular object and the potentially large number of client processes which might hold such interfaces. It would not be unusual for an object to receive 1000 periodic keep-alive signals. Regardless of the communications medium used, this would impose a large overhead on the system.

SUMMARY OF THE INVENTION

The invention provides several improvements which, together, make pinging techniques much more practical than they have been in the past. In one aspect of the invention, keep-alive messages between individual pairs of client and server processes are coalesced into single, inter-process messages to reduce communications overhead. In a further aspect of the invention, each client process registers with a ping manager, and the ping manager sends the appropriate keep-alive messages while monitoring its registered client processes to determine whether they are still executing.

A still further aspect of the invention involves client-side ping managers and server-side ping managers. Each client process registers interfaces it is holding with a client-side ping manager. Server processes register with a server-side ping manager. Each client-side ping manager periodically sends messages to the server-side ping manager indicating any registered interfaces held by registered client processes. With this information, the server-side ping manager keeps track of whether any client processes hold interfaces for a particular object, and notifies the server processes if they do not. As an improvement on this aspect of the invention, the server-side ping manager implements an object interface which can be accessed by the client-side ping manager to maintain a set or list of interfaces registered with the client-side ping manager. Rather than periodically sending a complete list of such interfaces, client-side ping manager needs only to send changes to such information to the server-side ping manager, while the server-side ping manager stores and monitors the list. The client-side ping manager periodically sends a keep-alive signal to the server-side ping manager through its object interface. If such a keep-alive signal is not periodically received, the server-side ping manager assumes that the interfaces registered with the client-side ping manager are no longer needed and destroys the list which was formerly stored on behalf of the client-side ping manager.

DETAILED DESCRIPTION

Figure 2:
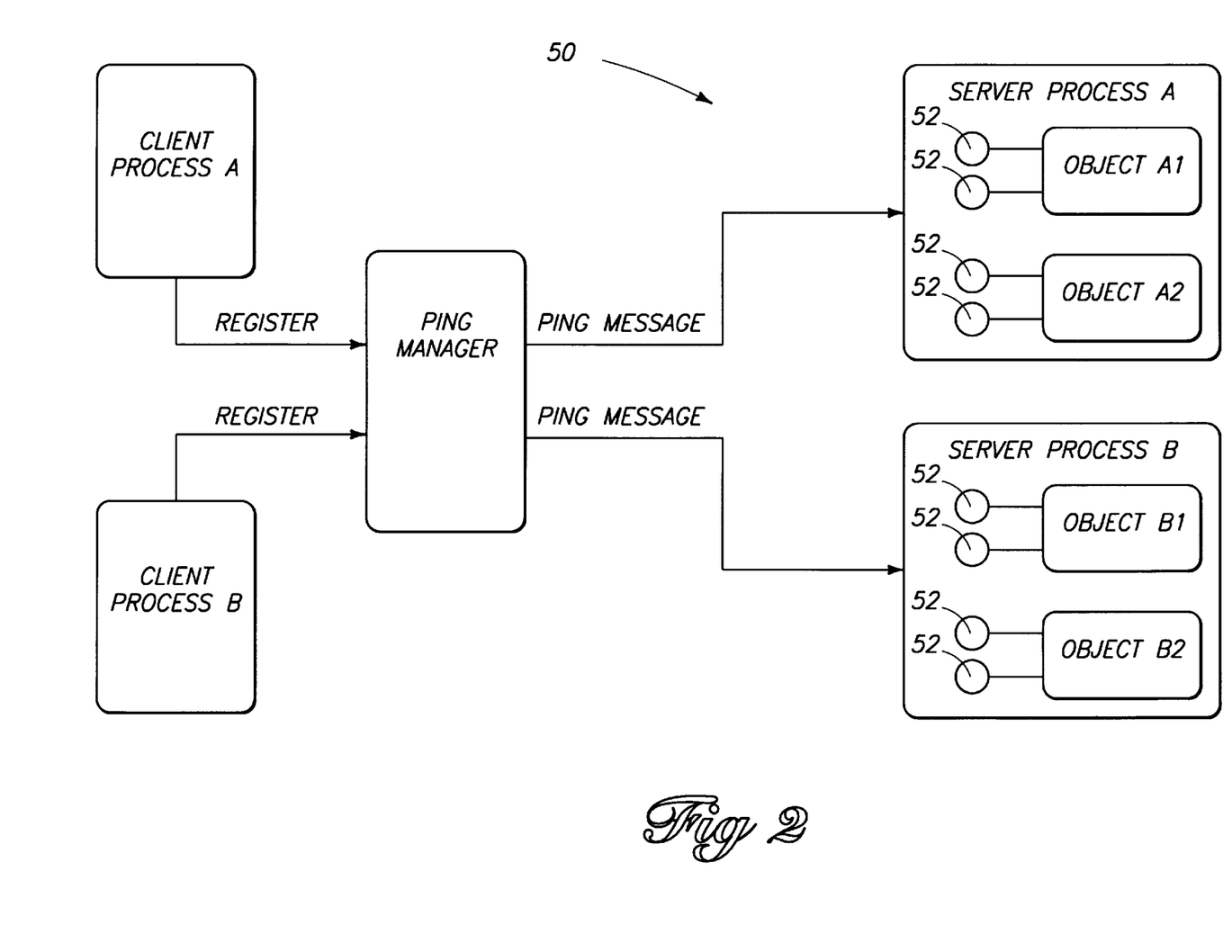
FIG. 2 is a block diagram of a computer system in accordance with one embodiment of the invention.

FIG. 2 shows a computer system in accordance with one preferred embodiment of the invention, generally labeled with the reference numeral 50. Computer system 50 includes a plurality of client processes. The term "process" in this document is used to designate a stand-alone application or subprogram that is run as an independent entity. In the preferred environment described herein, each process executes in its own, respective address space. Two client processes, A and B, are illustrated in FIG. 2. Computer system 50 also includes one or more server processes which execute independently of the client processes. In the preferred embodiment described herein, the server processes execute in their own, respective address spaces, different than the address spaces of the client processes. For purposes of this discussion, two server processes A and B are shown.

Each server process has a plurality of objects and corresponding interfaces. For instance, server process A has objects A1 and A2. Server process B has objects B1 and B2. Each object has one or more interfaces, labeled in FIG. 2 with the reference numeral 52. The server processes dynamically create their objects and associated interfaces in response to demand for them by one or more client processes. Any single interface can be simultaneously used or held for use during at least a portion of its lifetime by more than one different client process. Server processes implement reference counting as discussed above to keep track of whether the objects and their interfaces are being held for use by any client processes. Generally, if there is no further demand for interfaces and/or their associated objects, they are destroyed by the server processes. In the preferred embodiment of the invention, the operating system implements interface reference counting so that interfaces can be destroyed independently of their associated objects.

The computer system of FIG. 2 implements a pinging system so that server processes can destroy objects and interfaces as appropriate even when client processes fail to release such objects and interfaces. This might happen, for example, when a client process crashes before releasing an interface. It might also happen because of faulty program design in a client process. In either case, it is desirable for the server process to be able to destroy its objects and their interfaces when they are no longer needed.

In the prior art, a pinging system might have been implemented by sending individual keep-alive messages from every client process to every server process holding an interface on that server process. However, such inter-process messages would incur significant communications overhead. A more efficient pinging scheme is used in the preferred embodiment of the invention. In one aspect of the invention, each client process generates keep-alive signals corresponding to interfaces which it is holding for use. Rather than sending each of these signals individually, however, a step is performed of coalescing keep-alive signals from individual client processes into single inter-process messages which are periodically sent from individual client processes to the server processes.

More specifically, the preferred embodiment of the invention utilizes one or more ping managers as shown in FIG. 2. Each client process registers itself and any interfaces it is holding with an associated one of the ping managers. The ping managers then take over the responsibility of sending keep-alive messages to individual server processes. Furthermore, the ping managers perform steps of monitoring whether any of their registered client processes have terminated, and of automatically unregistering the interfaces any such client processes which have terminated. Instead of each client process sending an individual inter-process signal corresponding to each interface it is holding, the ping manager periodically sends a single inter-process ping message destined for each server process. This single inter-process ping message contains a set of keep-alive signals corresponding to only those server process interfaces that are registered with the ping manager. If a formerly registered client process terminates, its associated ping manager detects the termination and ceases to send keep-alive signals on behalf of the terminated client process and its formerly held interfaces. Keep-alive signals are sent only for interfaces which remain registered with the ping manager.

In addition to reference counting, the server process keeps track of keep-alive signals received for each interface. If a keep-alive signal for a particular interface is not received within a pre-defined time-out period, the interface is destroyed. If no keep-alive signals for interfaces on a particular object are received within the pre-defined pinging time-out period, the entire object is potentially destroyed.

Figure 3:
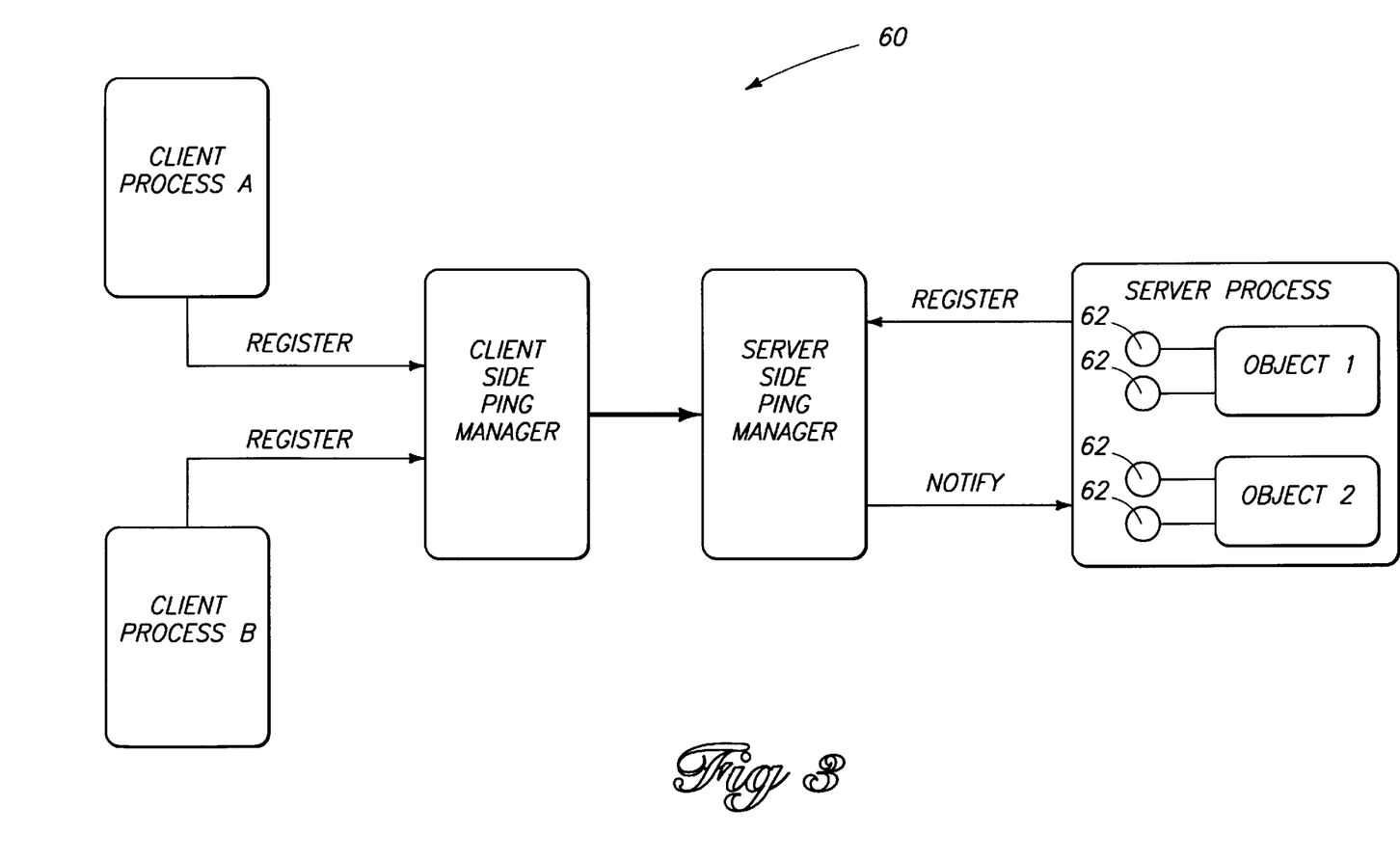
FIG. 3 is a block diagram of a computer system in accordance with another embodiment of the invention.

FIG. 3 shows a further improvement in accordance with the invention. A computer system in accordance with this aspect of the invention is generally referenced by the numeral 60. As in the system of FIG. 2, computer system 60 includes a plurality of client processes, each executing independently in its own, respective address space. Two client processes, A and B, are illustrated. Computer system 60 also includes one or more server processes, executing independently in their own, respective address spaces, different than the address spaces of the client processes. In this case, only a single server process is shown. Each server process has one or more available server objects for potential use by the client processes. The server process in FIG. 3 is shown as having two available objects, 1 and 2.

The server objects are accessible by client processes through a plurality of server object interfaces dynamically created in response to demand for them by the client processes. Generally, the interfaces are destroyed when there is no further demand for them. The objects of FIG. 3 are shown as each having two available interfaces, indicated by reference numeral 62. Each interface can potentially be held for use during its lifetime by a plurality of client processes.

Computer system 60 includes one or more ping managers for client processes (client-side ping managers) and one or more ping managers for server processes (server-side ping managers). For purposes of discussion, only one of each type of ping manager is shown. It should be noted here that the discussion has been simplified by designating each process as either a client process or a server process. However, processes typically act in the capacity of both clients and servers. Similarly, the ping managers are represented in this discussion as performing either server services or client services. However, it is desirable to implement a single application program which performs the functions of both a client-side ping manager and a server-side ping manager.

The client-side ping manager functions similarly to the single ping manager of FIG. 2. Each client process registers itself and any interfaces it is holding with an associated client-side ping manager. The client-side ping manager monitors whether any of its registered client processes have terminated, and automatically unregisters any such terminated client processes and any interfaces they were holding. Client processes periodically update their client-side ping managers to notify them of additional interfaces being held or of interfaces which have been released.

Each server process is associated with a server-side ping manager. To create this association, the server process registers its objects and their interfaces with the server-side ping manager when those objects and interfaces are instantiated.

Each client-side ping manager maintains a list or set of server process interfaces which remain registered with the client-side ping manager. The client-side ping manager periodically sends single inter-process messages or "pings" to server-side ping managers associated with the server processes having interfaces held by client processes registered with the client-side ping manager. These messages consist of keep-alive signals for such interfaces. Keep-alive messages are sent at periodic intervals referred to herein as ping periods.

The server-side ping manager receives the periodic inter-process messages and keeps track of which server process interfaces are being held for use by one or more client processes. If a keep-alive message for a particular interface is not received for a pre-defined pinging time-out period, the server-side ping manager associated with the server process notifies the server process accordingly, and the server process can destroy the interface if that is appropriate.

Figure 4:
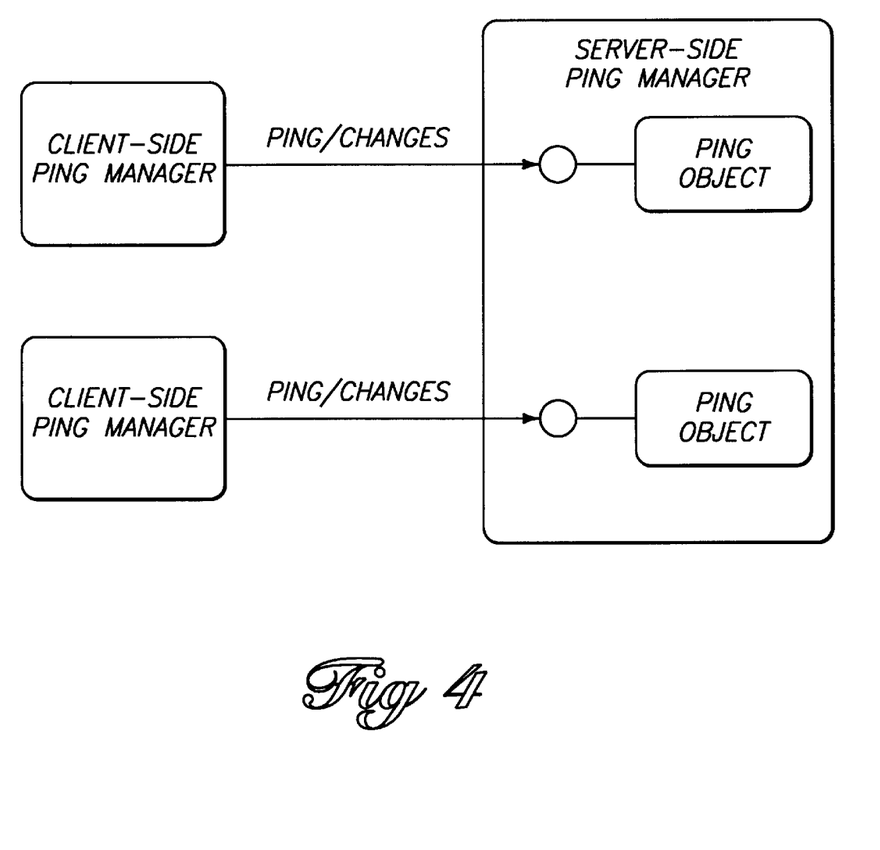
FIG. 4 is a block diagram showing a server-side ping manager and the client side ping managers of FIG. 3.

In the preferred embodiment, the server-side ping manager stores interface lists or sets as shown in FIG. 4. Each set is implemented as an object of the server-side ping manager, referred to herein as a ping object, with an interface available for use by a client-side ping manager. Each ping object contains a list of server object interfaces registered with a single client-side ping manager. Each client-side ping manager accesses the server-side ping manager through its object interface to maintain an interface set or ping object with the server-side ping manager. The interface set indicates server object interfaces which remain registered with the client-side ping manager. By maintaining its interface list in the form of sets at server-side ping managers, a client-side ping manager only needs to send changes to the sets. It does not need to send the entire sets every ping period. Rather than sending a keep-alive signal for every one of its interfaces, every client-side ping manager that has registered client processes holding object interfaces of server processes periodically sends a single keep-alive signal to the server-side ping managers of such server processes. In other words, rather than pinging each interface, a client-side ping manager just pings the ping objects it is maintaining.

The server-side ping manager receives the keep-alive signals and monitors whether they continue to be sent. If a keep-alive signal is not received from a particular client-side ping manager during a pre-defined time-out period, the server-side ping manager assumes that the processes registered with the client-side ping manager have terminated or crashed, and destroys the interface set associated with that client-side ping manager. The server-side ping manager regularly inspects its interface lists and notifies any of its own registered server processes of any registered interfaces which are no longer included in any of the interface lists. The server processes can safely destroy these interfaces.

The various client and server processes described above can reside and execute on a single computer or on multiple computers. In a single computer system, only one client-side ping manager and one server-side ping manager is required, and their functions can conveniently be combined in a single application program with appropriate interfaces for both client and server processes.

In many cases, a computer system includes at least two computers connected through a network for data communications. Using remote procedure calls, processes executing on one computer can access interfaces of objects instantiated on a different computer.

Figure 5:
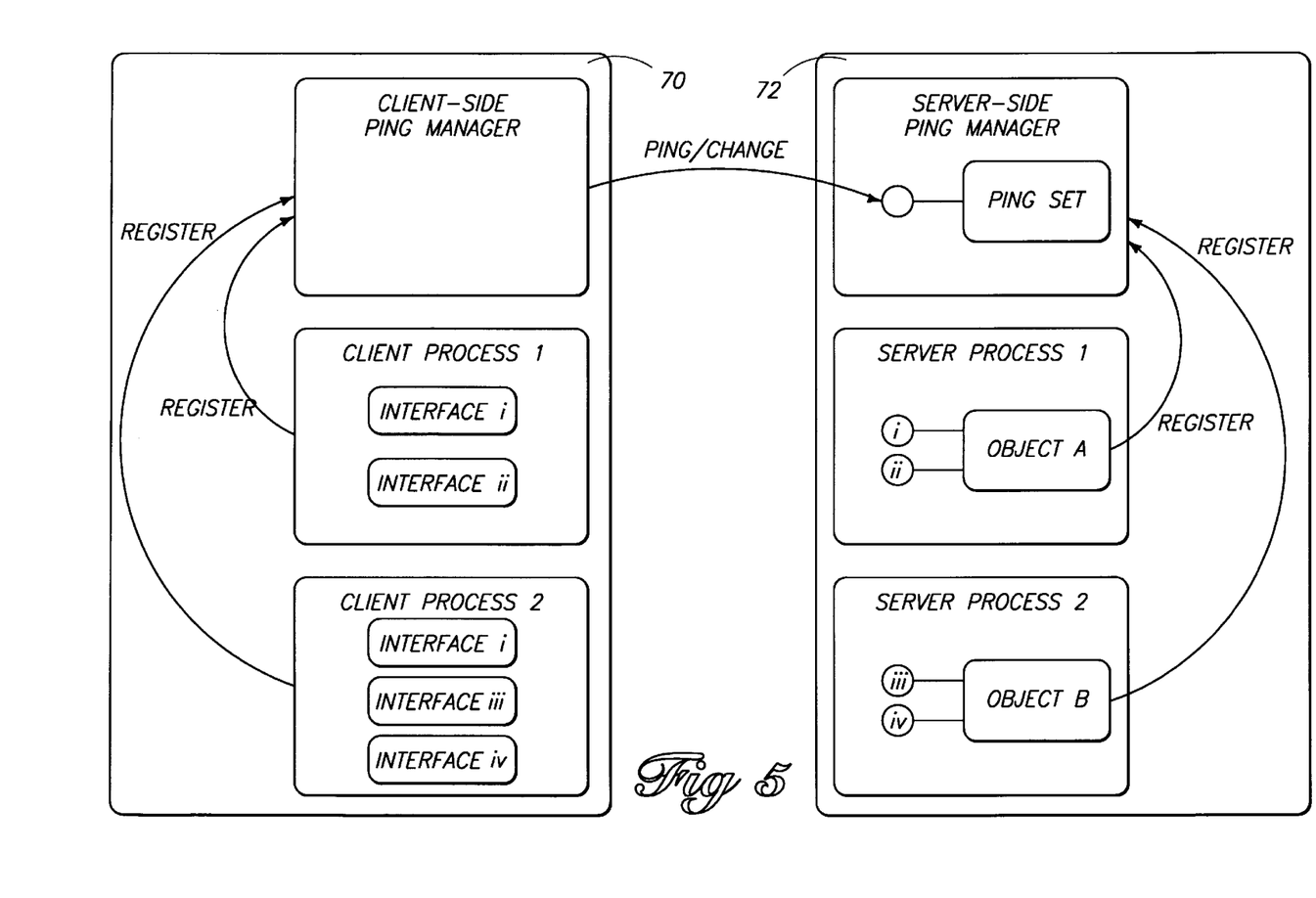
FIG. 5 is a block diagram of a computer system in accordance with yet another embodiment of the invention.

FIG. 5 shows a computer configuration having two computers 70 and 72. Computers 70 and 72 are connected for data communications with a local area or wide area network. They also support remote procedure calls so that one computer can access services of the other. In the example shown, server processes execute on one computer while client processes execute on a different computer. In practice, each computer is likely to have both client processes and server processes, and single processes are in fact likely to act as both clients and servers. Computer 70, which will be referred to as a client computer, is illustrated as having two client processes, labeled Client Process 1 and Client Process 2. Computer 72, which will be referred to as a server computer, is illustrated as having two server processes, labeled Server Process 1 and Server Process 2.

Each server process is shown as implementing an object. Server process 1 implements an object A and server process 2 implements an object B. Each object has two interfaces. Object A has interfaces i and ii, and object B has interfaces iii and iv. The client processes of client computer 70 hold references to the interfaces of objects A and B. This is indicated by the rectangular boxes shown within the client processes. Client process 1 is holding references to interface i of object A is and interface ii of object A. Client process 2 is holding references to interface i of object A, interface iii of object B, and interface iv of object B. Note that interface i of object A is being held for use by both of client processes 1 and 2.

Each computer has a single ping manager. In FIG. 5, client computer 70 is shown as having a client-side ping manager, while server computer 72 is shown as having a server-side ping manager. In practice, each computer is likely to have a single ping manager performing both client-side and server-side functions.

In accordance with preferred aspects of the invention, all client processes executing on a particular computer register with a single client-side ping manager which executes on that computer. During registration, each client process notifies its associated client-side ping manager of interfaces being held for use. Subsequently, the client processes register new interfaces as they are obtained and unregister interfaces that are released.

On the server side, all server processes executing on a particular computer register with the server-side ping manager executing on that computer. Upon registration, each server process notifies its associated server-side ping manager of objects and interfaces which have been exposed to clients. Subsequently, the server processes notify their server-side ping managers when new interfaces are exposed or when interfaces and objects are destroyed.

As shown in FIG. 5, the client-side ping manager maintains a ping object or "ping set" with the server-side ping manager. The ping set, as already described, is an object which is accessed through an object interface. The client-side ping manager maintains a ping set on any server computer which has interfaces being held by client processes registered with the client-side ping manager. Each server-side ping manager thus has a ping set for every client computer having processes is holding interfaces on objects instantiated in the server computer of the server-side ping manager.

In practical usage, the first time a client computer needs to ping a server computer, the client-side ping manager negotiates a set token corresponding to a ping set representing all server-owned interfaces held by the client computer. As the client computer adds and releases interfaces owned by the server computer, the client-side ping manager adds or deletes interfaces from the ping set identified by the set token. A particular server-side ping manager has one ping set and one set token for each client-side ping manager that holds interfaces to the server computer.

Since each server-side ping manager maintains its ping sets independently of other server-side ping managers, it is possible for a client-side ping manager to reuse the same set token for each server computer it pings. Thus, it is possible to use the client computer's machine identity GUID as a set token. A GUID is an identifier used in the OLE and COM environments which is guaranteed to be unique over space and time. Each computer has a unique machine identity GUID. Similarly, the client-side ping manager must maintain a list of server computers to ping. The client ping-manager identifies each server computer by its machine identity GUID.

The client-side ping manager periodically sends a keep-alive message or signal to every server-side ping manager on which the client-side ping manager is maintaining a ping set. This message is also used to designate any desired changes in the ping set. Thus, a single inter-process message takes care of both pinging and ping set management. This reduces inter-process communications requirements. Other inter-process administrative messages might also be included in the keep-alive messages to further reduce communications overhead.

The client-side ping manager monitors all registered client processes to detect whether they have terminated without unregistering themselves. When a client process registers an interface, the client-side ping manager obtains the process handle identifying the client process. The client-side ping manager then spawns an execution thread to wait on the process handle. If the process terminates, the operating system wakes the waiting thread, thus notifying the ping manager that the client process has terminated. The Window NT® environment provides facilities for waiting on multiple process so that only one execution thread needs to be spawned. However, it would be possible to spawn a unique thread to wait on each thread individually.

The interfaces of any terminated client processes are automatically unregistered by the client-side ping manager and deleted from ping sets. The server-side ping manager keeps track of all interfaces designated in ping sets, and compares these designations to the list of interfaces which have been registered by server processes. If an interface is absent from a ping set for a pre-defined period, the appropriate server process is notified so that the interface, and possibly the corresponding object, can be destroyed.

Pinging between ping managers generally takes place at specified ping periods such as 60 seconds. Due to the unreliability of many inter-process communications channels, it is desirable to provide a grace factor so that interfaces are not immediately destroyed if a ping does not occur during every ping period. In general, the grace factor is given in multiples of ping periods. For example, a grace factor of 5 means an interface will not be destroyed (by the server computer) until 5 ping periods have elapsed without a ping. If the grace factor is 5, the pinging time-out period is equal to 5 times the ping period.

Many interfaces are obtained and then released very quickly. It has been found to be inefficient to implement pinging for such interfaces. Accordingly, a particular client process is desirably programmed to notify its associated client-side ping manager of interfaces being held for use only when such interfaces have been held for a minimum time period. Alternatively, the client process performs such notification only at pre-defined intervals, wherein such pre-defined intervals are preferably equal to the ping period. Using this scheme, any interfaces which are obtained and released within the same ping period are not registered. Only those interfaces being held at the time of the ping are registered. Even with this algorithm, some short-lived interfaces are registered, but considerably less than all such interfaces.

This method of delayed registration depends heavily on the grace factor already mentioned. The grace factor must be at least 2 and probably 3. In practice, the grace factor is set to 10 to 15 to accommodate delayed registration. This could be reduced by using a larger ping cycle. In the actual implementation of the invention currently contemplated, the ping period is 30 seconds and the grace factor is 10 ping periods. These values are variable and depend on the usage and load of the system.

Once an interface is registered by both the client computer and server computer, pinging becomes completely transparent to the processes using the interfaces. The client-side server pings the server-side ping manager every ping period, and as long as nothing changes no other communication is needed between the processes and the ping managers. If an interface is removed from a client process or an object removes the interface from server computer, the respective ping manager needs to be notified that the interface has been removed and no longer pinged. If the server does not receive a ping in a timely fashion, the server's ping manager must notify the object's process that the interface has been terminated at which time the process can clean up after the interface.

Enhancements to the basic scheme are of course possible. One enhancement is to implement the server-side ping manager so that interfaces can be pinged individually, apart from their inclusion in a ping set. Further, ping sets themselves can be grouped or nested and included in higher level ping sets, since a ping set is itself an interface on an object in the preferred embodiment of the invention.

The pinging mechanisms described above have been successfully implemented. The pinging protocol keeps the overhead of pinging to a minimum. Ping messages are normally sent on a per-computer basis, so there is only one stream of ping messages sent from a computer A to a computer B. The protocol also provides a delta mechanism that removes from the ping messages explicit communications overhead for long-lived or stable remote object references, so the ping messages can be small even if computer A holds many remote object references to objects on computer B. It is contemplated that ping messages originating with multiple computers might be combined on their way to computer B, resulting in even further optimization.

One of the biggest problems in implementation was to maintain the reliability of the ping manager in the face of network failures and process crashes. The ping manager must survive this hostile environment and perform its timely pinging functions to keep remote interfaces active. During implementation of the invention in the Windows NT® operating environment, several potential difficulties were encountered. These issues, summarized below, may or may not be pertinent to implementations in other operating environments.

Network Failures. If a network communications path fails while a ping manager is using it, the execution thread in the ping manager will be blocked until a communications time-out occurs. If the ping manager pings all servers one after another in a single execution thread, the execution thread will be blocked until the communications time-out. It has been found that given a significant network failure, accumulative communications time-outs might exceed the pinging time-out period, and the ping manager might be unable to ping the remaining servers in a timely manner. A solution is for a ping manager to ping each server computer on a unique thread so that if one server has a communications problem it does not effect pinging of other servers.

Polling vs. Posting: The ping managers must be very robust. It has been found that robustness can be increased by reducing the remote procedure calls initiated by the ping managers. In other words, the ping managers should, as much as possible, act as server processes rather than client processes. In general, the ping manager should not create connections. When registering an interface, the process should register with the ping manager, acting as a client to the ping server, and not the other way around. While the ping manager must act as a client in order to ping other computers, this is an exception for which special measures (multiple threads) are implemented.

Idempotent and Maybe: The term "maybe" indicates a one-way communication from a client computer to a server computer. It is called "maybe" because the client computer gets no acknowledgment that the message got to the server computer—that is, "maybe" it got there. This method of communications is unreliable, but can be compensated for by making the server computer "idempotent" and transmitting the message more than once. This method would seem ideal for pinging, especially where grace factors are implemented. However, it has been found that the "maybe" method of pinging sometimes results in a number of consecutive failures. The preferred embodiment thus requires acknowledgments to pings, rather than using "maybe" messages.

Process Crashes: Both server and client processes will crash unexpectedly. Under these conditions the ping manager must recover and cleanup after the process that crashed. In the preferred implementation, whenever an interface is registered by a process with a ping manager, the process is noted and an event is set to wait on termination of that process. When a client process crashes, the ping manager cleans out the interfaces formerly held by the process and removes the interfaces from the appropriate ping set with the next ping message. These interfaces should not, however, be removed from other ping sets. Furthermore, they should not be removed entirely from the server-side ping manager since there is the possibility that other client processes might be pinging the interfaces directly.

If a server process crashes, the ping manager just cleans out the interfaces owned by that process. Pings may continue to come in for these interfaces and the ping manager must ignore them. Eventually, client processes will try to use the interfaces which will result in a remote procedure call failure.

If a client process crashes while the interfaces held by that process are being pinged, it is possible that the cleanup code will delete the ping set data structures out from under the pinging, thus causing a general protection fault. Under normal conditions this would be protected by a lock. However, for performance reasons it is unreasonable to lock the ping set data structures for the duration of a ping. To circumvent this, the preferred embodiment of the invention uses two data structures for each interface registered. One is associated with the process holding the interface and the other is used during pinging. The pinging data structure is reference counted and is only deleted when it goes to zero. The process data structure holds a reference count on the pinging data structure, and releases it when the associated process terminates. Just before a ping cycle starts, the reference counts of all of the pinging data structures are incremented so they will not be deleted. Once the ping cycle is complete, the pinging data structures are released by decrementing their reference counts. If during the ping cycle the client process dies, the reference count on the pinging data structure will hold the data valid until the ping cycle is complete.

Communication on Ping Cycles: Ping managers talk to each other on a regular cycle. It has been found that if inter-process/inter-machine communication is needed, tagging the information along with the ping information is more efficient than an asynchronous communication. Both network overhead and thread scheduling is reduced by batching requests. In the preferred embodiment of the invention, any process can communicate with the local ping manager through its registration thread. The information can then be interpreted by the ping manager or forwarded along with the next ping cycle to another machine as appropriate. This mechanism can be used to maintain non-critical information and provide for background maintenance. An example would be to acquire additional remote references for an interface when the currently held count is small.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer system comprising:

a plurality of client processes;

a server process;

the server process having a plurality of interfaces which it creates dynamically in response to demand for said interfaces by the client processes, the server process destroying the interfaces when there is no further demand for them, each created interface being simultaneously held for use during at least a portion of its lifetime by more than one of the client processes;

one or more ping managers, each client process being registered with an associated one of the ping managers, wherein each client process registers with its associated ping manager any server interfaces which it is holding for use;

each ping manager monitoring whether any of its registered client processes have terminated, and automatically unregistering the interfaces held by any such client processes which have terminated;

an individual one of the ping managers periodically sending a single inter-process message destined for the server process, said single inter-process message containing a set of keep-alive signals corresponding to only those server process interfaces which remain registered with said individual ping manager;

wherein a particular client process notifies its associated ping manager of interfaces being held for use only at pre-defined intervals.

2. A computer system as recited in claim 1, wherein the client and server processes execute in respectively separate address spaces.

3. A computer system as recited in claim 1, the server process destroying an individual interface if a keep-alive signal corresponding to said individual interface is not received from a ping manager during a pre-defined time-out period.

4. A computer system as recited in claim 1 and further comprising at least two computers connected for data communications, the server process executing on a different computer than the client process, wherein client processes executing on a particular computer register with a single ping manager executing on that particular computer.

5. A computer system as recited in claim 1 wherein a particular client process notifies its associated ping manager of interfaces being held for use only when such interfaces have been held for a minimum time period.

6. A computer system comprising:

a plurality of client processes;

a server process;

the server process having a plurality of interfaces which it dynamically creates in response to demand for said interfaces by the client processes, the server process potentially destroying the interfaces when there is no further demand for them, each created interface being simultaneously held for use during at least a portion of its lifetime by more than one of the client processes;

one or more ping managers, each client process being registered with an associated one of the ping managers, wherein each client process registers with its associated ping manager any interfaces which it is holding for use;

the server process being associated with a particular one of the ping managers, wherein said particular one of the ping managers keeps track of which server process interfaces are being held for use by one or more client processes;

each ping manager monitoring whether any of its registered client processes have terminated, and automatically unregistering the interfaces held by any such client processes which have terminated;

each ping manager maintaining a list of server process interfaces which remain registered with the ping manager, an individual ping manager periodically sending a single inter-process message to the ping manager associated with the server process, said single inter-process message indicating any changes in the list of server process interfaces which remain registered with said individual ping manager;

the ping manager associated with the server process notifying the server process of any server process interfaces which are no longer held for use by one or more client processes.

7. A computer system as recited in claim 6, the single inter-process message also including administrative messages between client processes and the server process.

8. A computer system as recited in claim 6 and further comprising at least two computers connected for data communications, the server process executing on a different computer than the client process, wherein client processes executing on a particular computer register with a single client-side ping manager executing on that particular computer, and wherein server processes executing on an individual computer register with a single server-side ping manager executing on said individual computer.

9. A computer system as recited in claim 6 wherein a particular client process registers its interfaces only when such interfaces have been held for a minimum time period.

10. A computer system as recited in claim 6 wherein a particular client process registers its interfaces only at pre-defined intervals.

11. A computer system comprising:

a plurality of client processes;

a server process having one or more available server objects for potential use by the client processes;

the server objects being accessible by the client processes through a plurality of server object interfaces dynamically created in response to demand for said interfaces by the client processes, the server object interfaces being potentially destroyed when there is no further demand for them, each created server object interface being simultaneously held for use during at least a portion of its lifetime by more than one of the client processes;

one or more client-side ping managers, each client process being registered with an associated one of the client-side ping managers, wherein each client process registers interfaces it is holding for use with the associated client-side ping manager;

each client-side ping manager monitoring whether any of its registered client processes have terminated, and automatically unregistering the interfaces of any such client processes which have terminated;

a server-side ping manager, wherein the server-side ping manager stores one or more interface lists indicating server object interfaces held for use by client processes;

the server-side ping manager having a ping manager object interface available to the client-side ping managers, each client-side ping manager accessing the server-side ping manager through the ping manager object interface to maintain an interface list with the server-side ping manager indicating server object interfaces which remain registered with the client-side ping manager;

the server-side ping manager notifying the server process of any server object interfaces which are no longer included in the interface lists of the server-side ping manager.

12. A computer system as recited in claim 11 wherein each client-side ping manager that has registered client processes holding server object interfaces periodically sends a single keep-alive signal to the server-side ping manager, the server-side ping manager destroying the interface list maintained by a particular client-side ping manager if a keep-alive signal is not received from said particular client-side ping manager during a pre-defined time-out period.

13. A computer system as recited in claim 11 wherein each client-side ping manager that has registered client processes holding server object interfaces periodically sends a single keep-alive message to the server side ping manager, said keep-alive message also including a designation of any desired changes in the interface list maintained by the client-side ping manager with the server-side ping manager, the server-side ping manager destroying the interface list maintained by a particular client-side ping manager if a keep-alive message is not received from said particular client-side ping manager during a pre-defined time-out period.

14. A computer system as recited in claim 11 wherein each client-side ping manager that has registered client processes holding server object interfaces periodically sends a single keep-alive message to the server side ping manager, said keep-alive message also including administrative messages between client processes and the server process.

15. A computer system as recited in claim 11 wherein each client-side ping manager that has registered client processes holding server object interfaces periodically sends a single keep-alive message to the server side ping manager at a selected ping period, said keep-alive message also including a designation of any desired changes in the interface list maintained by the client-side ping manager with the server-side ping manager, the server-side ping manager destroying the interface list maintained by a particular client-side ping manager if a keep-alive message is not received from said particular client-side ping manager during a pre-defined time-out period, wherein a particular client process notifies its associated client-side ping manager of interfaces being held for use only at pre-defined intervals which are approximately equal to the selected ping period.

16. A computer system as recited in claim 11 wherein a particular client process notifies its associated client-side ping manager of interfaces being held for use only when such interfaces have been held for a minimum time period.

17. A computer system as recited in claim 11 wherein a particular client process notifies its associated ping manager of interfaces being held for use only at pre-defined intervals.

18. A computer system as recited in claim 11, further comprising at least two computers connected for data communications, the server process executing on a different computer than the client processes, wherein client processes executing on a particular computer register with a single client-side ping manager executing on that particular computer, and wherein server processes executing on an individual computer register with a single server-side ping manager executing on said individual computer.

19. A method of monitoring interface use, comprising the following steps:

executing a plurality of client processes;

executing a server process;

dynamically creating a plurality of server process interfaces in response to demand for said interfaces by the client processes;

more than one of the client processes simultaneously holding each of said created interfaces for use during at least a portion of its lifetime;

executing one or more ping managers;

registering each client process and interfaces being held by said client process with an associated ping manager;

each ping manager monitoring whether any of its registered client processes have terminated, and automatically unregistering the interfaces of any such client processes which have terminated;

an individual ping manager composing a single inter-process message destined for the server process, said inter-process message containing a set of keep-alive signals corresponding to only those server process interfaces which remain registered with said individual ping manager;

wherein the step of registering interfaces being held by the client processes is performed only at pre-defined intervals.

20. A method as recited in claim 19 further comprising destroying an individual interface if a keep-alive signal corresponding to said individual interface is not received from one of the ping managers during a pre-defined time-out period.

21. A method as recited in claim 19 and further comprising:

connecting at least two computers for data communications;

executing the server process on a different computer than the client processes;

registering the interfaces of each client process executing on a particular computer with a single ping manager executing on that particular computer.

22. A method as recited in claim 19 wherein the step of registering interfaces being held by the client processes is performed only when such interfaces have been held for a minimum time period.

23. A method of monitoring interface use, comprising the following steps:

executing a plurality of client processes;

executing a server process having one or more available server objects for potential use by the client processes;

exposing the server objects through a plurality of server object interfaces that are dynamically created in response to demand for said interfaces by the client processes;

more than one of the client processes simultaneously holding each created server object interface for use during at least a portion of its lifetime;

executing one or more client-side ping managers;

registering each client process and server object interfaces held by said client process with an associated one of the client-side ping managers;

executing a server-side ping manager;

exposing a server-side ping manager interface for use by client-side ping managers, said interface allowing the client-side ping managers to maintain interface lists with the server-side ping manager indicating server object interfaces which remain registered with the client-side ping managers;

maintaining such interface lists from the client-side ping managers;

notifying the server process of server object interfaces that are no longer included in the interface lists of the server-side ping manager;

periodically, at selected ping periods, sending a keep-alive signal to the server-side ping manager from each client-side ping manager that has registered client processes holding server object interfaces;

including in said keep-alive signal a designation of any desired changes in the interface list maintained by the client-side ping manager with the server-side ping manager;

destroying the interface list maintained by a particular client-side ping manager if a keep-alive signal is not received from said particular client-side ping manager during a pre-defined time-out period;

wherein the step of registering interfaces being held by the client processes is performed only at pre-defined intervals which are approximately equal to the selected ping periods.

24. A method of monitoring interface use, comprising the following steps:

executing a plurality of client processes;

executing a server process having one or more available server objects for potential use by the client processes;

exposing the server objects through a plurality of server object interfaces that are dynamically created in response to demand for said interfaces by the client processes;

more than one of the client processes simultaneously holding each created server object interface for use during at least a portion of its lifetime;

executing one or more client-side ping managers;

registering each client process and server object interfaces held by said client process with an associated one of the client-side ping managers;

executing a server-side ping manager;

exposing a server-side ping manager interface for use by client-side ping managers, said interface allowing the client-side ping managers to maintain interface lists with the server-side ping manager indicating server object interfaces which remain registered with the client-side ping managers;

maintaining such interface lists from the client-side ping managers;

notifying the server process of server object interfaces that are no longer included in the interface lists of the server-side ping manager;

wherein registering interfaces being held by the client processes is performed only at pre-defined intervals.

25. A method as recited in claim 24 and further comprising:

periodically sending a keep-alive signal to the server-side ping manager from each client-side ping manager that has registered client processes holding server object interfaces;

destroying the interface list maintained by a particular client-side ping manager if a keep-alive signal is not received from said particular client-side ping manager during a pre-defined time-out period.

26. A method as recited in claim 24 and further comprising:

periodically sending a keep-alive signal to the server-side ping manager from each client-side ping manager that has registered client processes holding server object interfaces;

including in said keep-alive signal a designation of any desired changes in the interface list maintained by the client-side ping manager with the server-side ping manager;

destroying the interface list maintained by a particular client-side ping manager if a keep-alive signal is not received from said particular client-side ping manager during a pre-defined time-out period.

27. A method as recited in claim 24 further comprising:

periodically sending a keep-alive signal to the server-side ping manager from each client-side ping manager that has registered client processes holding server object interfaces;

including administrative messages between client processes and the server process in said keep-alive signal.

28. A method as recited in claim 24 wherein the step of registering interfaces being held by the client processes is performed only when such interfaces have been held for a minimum time period.

29. A method as recited in claim 24 further comprising:

connecting at least two computers for data communications;

executing the server process on a different computer than the client processes registering each client process executing on a particular computer with a single client-side ping manager executing on that particular computer;

registering server processes executing on an individual computer with a single server-side ping manager executing on said individual computer.

* * * * *

UNITED STATES PATENT AND TRADEMARK OFFICE
CERTIFICATE OF CORRECTION

PATENT NO. : 6,405,262 B1
DATED : June 11, 2002
INVENTOR(S) : Vogel et al.

It is certified that error appears in the above-identified patent and that said Letters Patent is hereby corrected as shown below:

Column 7,
Line 48, delete "is" after "processes".

Column 14,
Line 46, insert -- and -- between "19" and "further".

Column 16,
Lines 39 and 51, insert -- and -- between "24" and "further".

Signed and Sealed this

Nineteenth Day of November, 2002

Attest:

Attesting Officer

JAMES E. ROGAN
Director of the United States Patent and Trademark Office